Patented Aug. 25, 1953

2,650,233

UNITED STATES PATENT OFFICE 2,650,233

HALOALKOXY DERIVATIVES OF THE CYCLIC KETALS OF WARFARIN

Martin Seidman, Chicago, Ill., and Karl Paul Link, Middleton, Wis., assignors to Wisconsin Alumni Research Foundation, Madison, Wis., a corporation of Wisconsin No Drawing. Application March 1, 1951, Serial No. 213,486

5 Claims. (Cl. 260—343.2)

1

The present invention relates to new chemical compounds and processes of preparing the same. More specifically, the present invention is directed to certain 3,4-substituted coumarins and improved processes of preparing the same. The products of the present invention are of interest in the anticoagulant field generally and the rodenticide field specifically, and may be used as intermediates for the preparation of other products.

Shortly after the anticoagulant 3,3'-methylenebis (4-hydroxycoumarin) was isolated from spoiled sweet clover hay, identified, and synthesized, its marked toxicity in the rat was noted. H. S. Overman, J. B. Field, C. A. Baumann, and K. P. Link, J. Nutrition, 23, 589 (1942); K. P. Link, Harvey Lecture Series, 39, 162 (1943–44). The results of a recent survey in the rodenticide field have shown that 3-(α-acetonylbenzyl)-4-hydroxycoumarin (I), known in the art as warfarin, is approximately fifty times more lethal and in addition the time to effect kill is about half that required by 3,3'-methylenebis (4-hydroxycoumarin).

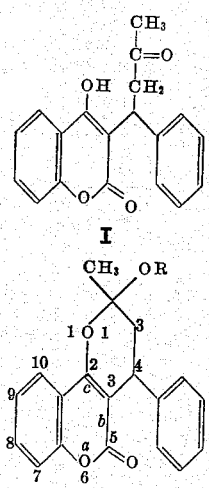

In the formulas (I) is warfarin or 3-(α-acetonylbenzyl)-4-hydroxycoumarin and (II) is 2 - methyl - 2 - (haloalkoxy) - 4 - phenyl - 5 - oxodihydropyrano(3,2-c)(1) benzopyran. These later products are cyclic ketals to which the present invention is directed. The following examples will serve to illustrate the present invention.

EXAMPLE I

2 - methyl - 2 - (β - chloroethoxy) - 4 - phenyl-5-oxodihydropyrano (3,2-c)(1) benzopyran.—

2

Into a mixture of 5 g. of warfarin (I) and 50 ml. of ethylene chlorohydrin was bubbled hydrogen chloride until a clear solution was obtained. After standing for three hours at room temperature the solution was poured into 500 ml. of ice and water yielding a gum. Upon treatment with 50 ml. of boiling methanol the gum crystallized. These crystals had a melting point of 189–191° C. After two recrystallizations from methanol the melting point was raised to 191–193° C.

From the mother liquor there was obtained 2.5 g. of crystals, M. P. 125–135° C. Recrystallization of this product twice from methanol yielded the diastereoisomer of the above compound, M. P. 132.5–134° C.

EXAMPLE II

2 - methyl - 2 - (γ - chloropropoxy) - 4 - phenyl - 5 - oxodihydropyrano (3,2 - c) benzopyran.—A mixture of 10 g. of warfarin (I) and 100 ml. of trimethylene chlorohydrin was treated with hydrogen chloride for five minutes at 5° C. whereupon solution resulted. After standing at room temperature for three hours the solution was poured with vigorous stirring into 1 liter of ice and water. An oil separated which crystallized upon being treated with 50 ml. of 95 per cent ethanol. From this mixture of racemates with a melting point of 107–135° C. a pure form was isolated by fractional crystallization from absolute ethanol, M. P. 127–128° C.

EXAMPLE III

2 - methyl - 2 - (β - bromoethoxy) - 4 - phenyl - 5 - oxodihydropyrano (3,2 - c)(1) benzopyran.—Into a suspension of 10 g. of warfarin (I) in 80 ml. of ethylene bromohydrin was bubbled hydrogen chloride. Solution occurred in approximately five minutes. After standing for two hours at room temperature the solution was poured into 500 ml. of ice and water yielding a gum. Upon treatment with 100 ml. of hot methanol the gum crystallized. After recrystallization from methanol the desired product was obtained, M. P. 182–183° C.

Warfarin (I) possesses an asymmetric carbon atom and the form used in the above reactions was the DL racemate. Since the synthesis of the cyclic ketals results in the formation of a second asymmetric carbon atom two diastereoisomeric racemates should be formed. The products were all obtained in very good yield as mixtures of isomers. Separation of a pure racemate was accomplished by fractional crystallization. Both racemic forms were obtained in Example I.

Various other derivatives of compound (II)

where R represents a haloalkylene group may be prepared in accordance with the above examples by reacting warfarin (I) with different halohydrins. For example, by substituting tetramethylene bromohydrin for the trimethylene chlorohydrin in Example II the bromobutoxy cyclic ketal is produced.

We claim:

1. The product, 2-methyl-2-(haloalkoxy)-4-phenyl-5-oxodihydropyrano (3,2-c)(1) benzopyran.
2. The product of claim 1 where the haloalkoxy group is β-chloroethoxy.
3. The product of claim 1 where the haloalkoxy group is γ-chloropropoxy.
4. The product of claim 1 where the haloalkoxy group is β-bromoethoxy.
5. The process of preparing a product in accordance with claim 1 which comprises reacting a halohydrin with 3-(α-acetonylbenzyl)-4-hydroxycoumarin in the presence of gaseous hydrogen chloride.

MARTIN SEIDMAN.
KARL PAUL LINK.

No references cited.